United States Patent
Hoiem et al.

(10) Patent No.: US 7,512,899 B1
(45) Date of Patent: Mar. 31, 2009

(54) METHOD AND APPARATUS FOR A UNIFIED USER INTERFACE

(75) Inventors: Derek Hoiem, Redmond, WA (US); Martyn S. Lovell, Seattle, WA (US); Steve Seixeiro, Snohomish, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/519,206

(22) Filed: Mar. 6, 2000

Related U.S. Application Data

(60) Provisional application No. 60/122,998, filed on Mar. 5, 1999.

(51) Int. Cl.
*G06F 3/00* (2006.01)

(52) U.S. Cl. .................. 715/825; 715/765; 715/762

(58) Field of Classification Search ............ 345/762, 345/760, 761, 763, 826, 825, 810, 765, 764; 571/762, 760, 761, 763, 826, 825, 810, 765, 571/764; 715/762, 760, 761, 763, 826, 825, 715/810, 765, 764
See application file for complete search history.

(56) References Cited

U.S. PATENT DOCUMENTS

| | | | | |
|---|---|---|---|---|
| 5,600,780 | A | * | 2/1997 | Hiraga et al. ............... 345/765 |
| 5,706,458 | A | * | 1/1998 | Koppolu ..................... 345/810 |
| 5,867,157 | A | * | 2/1999 | Goddard et al. ............. 345/762 |
| 6,317,143 | B1 | * | 11/2001 | Wugofski .................... 345/765 |
| 6,469,714 | B2 | * | 10/2002 | Buxton et al. ............... 345/762 |
| 6,496,203 | B1 | * | 12/2002 | Beaumont et al. ........... 345/762 |

* cited by examiner

*Primary Examiner*—Ba Huynh
*Assistant Examiner*—Mylinh Tran
(74) *Attorney, Agent, or Firm*—Woodcock Washburn LLP

(57) ABSTRACT

A unified user interface includes one or more component tables and a master table. The one or more component tables include resource information for the user interface with respect to a particular component. The master table includes resource information for the application and is merged from the one or more component tables. The component tables may be added or subtracted at any time and the master table is recreated by again merging the remaining or now existing component tables. The master table is used by a host application to build the user interface for a suite application. Components are only loaded and corresponding user interfaces built when appropriate commands are accessed. Thus, applications may be developed and components can be added or modified at a later time without rewriting the shell application or re-releasing a product.

12 Claims, 8 Drawing Sheets

```
CMDS_SECTION GuidVJPackage

MENUS_BEGIN
    GuidVJGrp:IDM_MYCONTEXT, GuidVJGrp:0, 0x0000, CONTEXT, "MyContextMenu", "&MyMenu";
MENUS_END NEWGROUPS_BEGIN
    GuidVJGrp:IDG_CUTCOPY,       GuidVJGrp:IDM_MYCONTEXT, 0x0100;
    GuidVJGrp:IDG_OVERRIDE,      GuidVJGrp:IDM_MYCONTEXT, 0x0300;
    GuidVJGrp:IDG_PROPERTIES,    GuidVJGrp:IDM_MYCONTEXT, 0x0500;
NEWGROUPS_END BUTTONS_BEGIN
    GuidVJCmd:VJCmdCut,        GuidVJGrp:IDG_CUTCOPY,    0x0100, GuidOfficeIcon:msotcidCut,        BUTTON, , "Cut";
    GuidVJCmd:VJCmdCopy,       GuidVJGrp:IDG_CUTCOPY,    0x0200, GuidOfficeIcon:msotcidCopy,       BUTTON, , "Copy";
    GuidVJCmd:VJCmdPaste,      GuidVJGrp:IDG_CUTCOPY,    0x0300, GuidOfficeIcon:msotcidPaste,      BUTTON, , "Paste";
    GuidVJCmd:VJCmdOverride,   GuidVJGrp:IDG_OVERRIDE,   0x0100, GuidOfficeIcon:msotcidNoIcon,     BUTTON, , "Override Method";
    GuidVJCmd:VJCmdProperties, GuidVJGrp:IDG_PROPERTIES, 0x0100, GuidOfficeIcon:msotcidProperties, BUTTON, , "View Properties", "&Properties";
BUTTONS_END

CMDS_END
```

METHOD AND APPARATUS FOR A UNIFIED USER INTERFACE

REFERENCES TO RELATED APPLICATIONS

This application claims the benefit of U.S. Provisional Application No. 60/122,998, filed Mar. 5, 1999, which is hereby incorporated herein by reference.

FIELD OF THE INVENTION

The present invention relates generally to user interfaces and more specifically to providing a unified user interface.

BACKGROUND

User interfaces are an important aspect of software. A well designed and implemented user interface can allow users to utilize a particular software product easily. A poorly designed and implemented user interface prevents users from being able fully utilize the functionality of a particular software product. Additionally, poorly designed user interfaces can frustrate users and cause them to switch to a competing software product. Therefore, a significant amount of time and money is spent in developing user interfaces for software products.

Traditionally, software or software products were built monolithically. Groups of developers working together joined their code together to make a single product. The general features and characteristics of the user interface were determined in the early stages.

Newer software development is performed by developing software from various components. This provides a more efficient software development environment and improves software reuse. Each component of a software product can be built independently by a separate team of programmers. Each component can be developed without waiting for other components to be completed and can be shipped at a different time.

However, the benefits of component-based development have not been realized in developing user interfaces. The user interface for a product still needs to be determined at an early stage of development and can not be greatly modified by the separate teams of programmers. Software developers must either fix the user interface of component-based products at the time the product is shipped or provide very limited, inflexible ways for components to change the user interface, which require loading the component into memory. Furthermore, even a minor change in the user interface desired by a component results in redeveloping the user interface. This can be a considerable problem when a product has already been released to manufacture.

Traditionally, a suite of applications may contain a number of applications such as a word processor, a database and a spreadsheet. However, the user interface for such a suite is required to be designed at an early stage and does not easily compensate for varying numbers of components. Additionally, all applications and components of the applications are required to be known when the user interface is being designed. Furthermore, all components are loaded into memory even if those components are not being used by a user. Additionally, the interfaces can not be modified easily once the product has been built.

Therefore, there is a need in the art for a modularized component approach to generating unified user interfaces.

SUMMARY OF THE INVENTION

One embodiment is a unified user interface for an application. The unified user interface includes one or more component tables and a master table. The one or more component tables include resource information for the user interface with respect to a particular component. The master table includes resource information for the application and is merged from the one or more component tables.

An alternate embodiment is a method for generating a user interface for a suite application having a host application and at least one component. A host application is started. A determination is made as to whether registry entries for the suite application have been altered. If the entries have been altered, component tables are reemerged into a master table. Default user interface components are built. Additional user interface components are built on demand.

Other user interfaces, systems and methods are disclosed.

BRIEF DESCRIPTION OF THE DRAWINGS

The present invention will be understood more fully from the detailed description given below and from the accompanying drawings of various embodiments of the invention. The drawings, however, should not be taken to limit the invention to the specific embodiments, but are for explanation and understanding only.

FIG. 3B is an example of a command table text file.

DETAILED DESCRIPTION

In the following detailed description of exemplary embodiments of the invention, reference is made to the accompanying drawings that form a part hereof and, which show by way of illustration, specific exemplary embodiments in which the invention may be practiced. These embodiments are described in sufficient detail to enable those skilled in the art to practice the invention. It is to be understood that other embodiments may be utilized and that logical, mechanical, electrical and other changes may be made without departing from the scope of the present invention. The following detailed description is, therefore, not to be taken in a limiting sense, and the scope of the present invention is defined only by the appended claims.

The detailed description is divided into three sections. The first section describes the hardware and the operating environment that is suitable for use as a server within the inventive storage system described below. The second section provides a detailed description of the novel interfaces, systems and methods for operating embodiments of the invention. Finally, the third section provides a conclusion of the detailed description.

Hardware and Operating Environment

Figure 1:
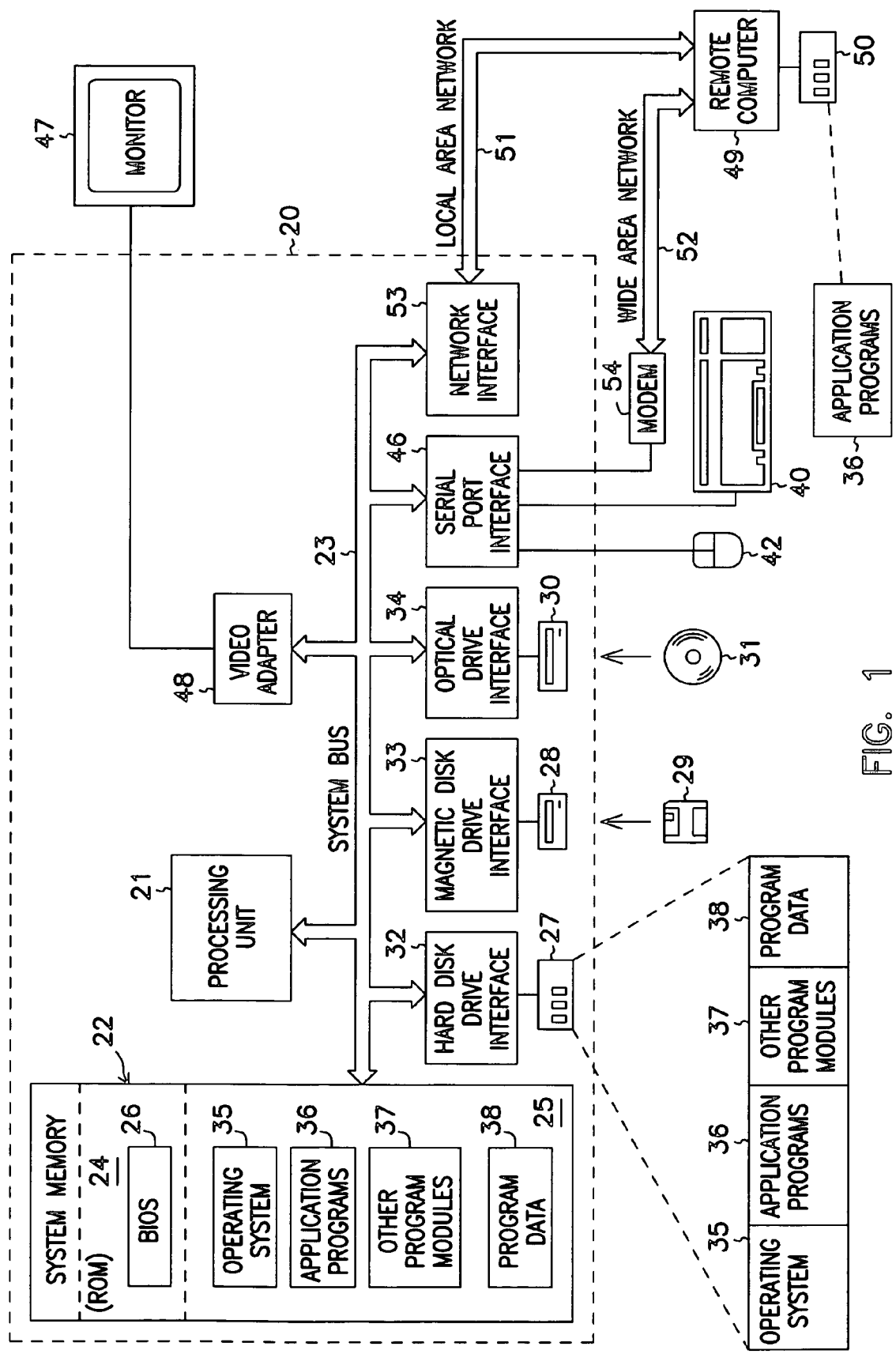
FIG. 1 describes an exemplary computing environment in which the invention may be implemented.

FIG. 1 provides a brief, general description of a suitable computing environment in which the invention may be implemented. The invention will hereinafter be described in the general context of computer-executable program modules containing instructions executed by a personal computer (PC). Program modules include routines, programs, objects, components, data structures, etc. that perform particular tasks or implement particular abstract data types. Those skilled in the art will appreciate that the invention may be practiced with other computer-system configurations, including hand-held devices, multiprocessor systems, microprocessor-based programmable consumer electronics, network PCs, minicomputers, mainframe computers, and the like which have multimedia capabilities. The invention may also be practiced in distributed computing environments where tasks are performed by remote processing devices linked through a communications network. In a distributed computing environment, program modules may be located in both local and remote memory storage devices.

FIG. 1 shows a general-purpose computing device in the form of a conventional personal computer 20, which includes processing unit 21, system memory 22, and system bus 23 that couples the system memory and other system components to processing unit 21. System bus 23 may be any of several types, including a memory bus or memory controller, a peripheral bus, and a local bus, and may use any of a variety of bus structures. System memory 22 includes read-only memory (ROM) 24 and random-access memory (RAM) 25. A basic input/output system (BIOS) 26, stored in ROM 24, contains the basic routines that transfer information between components of personal computer 20. BIOS 26 also contains start-up routines for the system. Personal computer 20 further includes hard disk drive 27 for reading from and writing to a hard disk (not shown), magnetic disk drive 28 for reading from and writing to a removable magnetic disk 29, and optical disk drive 30 for reading from and writing to a removable optical disk 31 such as a CD-ROM or other optical medium. Hard disk drive 27, magnetic disk drive 28, and optical disk drive 30 are connected to system bus 23 by a hard-disk drive interface 32, a magnetic-disk drive interface 33, and an optical-drive interface 34, respectively. The drives and their associated computer-readable media provide nonvolatile storage of computer-readable instructions, data structures, program modules and other data for personal computer 20. Although the exemplary environment described herein employs a hard disk, a removable magnetic disk 29 and a removable optical disk 31, those skilled in the art will appreciate that other types of computer-readable media which can store data accessible by a computer may also be used in the exemplary operating environment. Such media may include magnetic cassettes, flash-memory cards, digital versatile disks, Bernoulli cartridges, RAMs, ROMs, and the like.

Program modules may be stored on the hard disk, magnetic disk 29, optical disk 31, ROM 24 and RAM 25. Program modules may include operating system 35, one or more application programs 36, other program modules 37, and program data 38. A user may enter commands and information into personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial-port interface 46 coupled to system bus 23; but they may be connected through other interfaces not shown in FIG. 1, such as a parallel port, a game port, or a universal serial bus (USB). A monitor 47 or other display device also connects to system bus 23 via an interface such as a video adapter 48. In addition to the monitor, personal computers typically include other peripheral output devices (not shown) such as speakers and printers. In one embodiment, one or more speakers 57 or other audio output transducers are driven by sound adapter 56 connected to system bus 23.

Personal computer 20 may operate in a networked environment using logical connections to one or more remote computers such as remote computer 49. Remote computer 49 may be another personal computer, a server, a router, a network PC, a peer device, or other common network node. It typically includes many or all of the components described above in connection with personal computer 20; however, only a storage device 50 is illustrated in FIG. 1. The logical connections depicted in FIG. 1 include local-area network (LAN) 51 and a wide-area network (WAN) 52. Such networking environments are commonplace in offices, enterprise-wide computer networks, intranets and the Internet.

When placed in a LAN networking environment, PC 20 connects to local network 51 through a network interface or adapter 53. When used in a WAN networking environment such as the Internet, PC 20 typically includes modem 54 or other means for establishing communications over network 52. Modem 54 may be internal or external to PC 20, and connects to system bus 23 via serial-port interface 46. In a networked environment, program modules, such as those comprising Microsoft® Word which are depicted as residing within 20 or portions thereof may be stored in remote storage device 50. Of course, the network connections shown are illustrative, and other means of establishing a communications link between the computers may be substituted.

Software may be designed using many different methods, including object oriented programming methods. C++ and Java are two examples of common object oriented computer programming languages that provide functionality associated with object oriented programming. Object oriented programming methods provide a means to encapsulate data members (variables) and member functions (methods) that operate on that data into a single entity called a class. Object oriented programming methods also provide a means to create new classes based on existing classes.

An object is an instance of a class. The data members of an object are attributes that are stored inside the computer memory, and the methods are executable computer code that act upon this data, along with potentially providing other services. The notion of an object is exploited in the present invention in that certain aspects of the invention are implemented as objects in one embodiment.

An interface is a group of related functions that are organized into a named unit. Each interface may be uniquely identified by some identifier. Interfaces have no instantiation, that is, an interface is a definition only without the executable code needed to implement the methods which are specified by the interface. An object may support an interface by providing executable code for the methods specified by the interface. The executable code supplied by the object must comply with the definitions specified by the interface. The object may also provide additional methods. Those skilled in the art will recognize that interfaces are not limited to use in or by an object oriented programming environment.

Systems and Methods

Figure 2A:
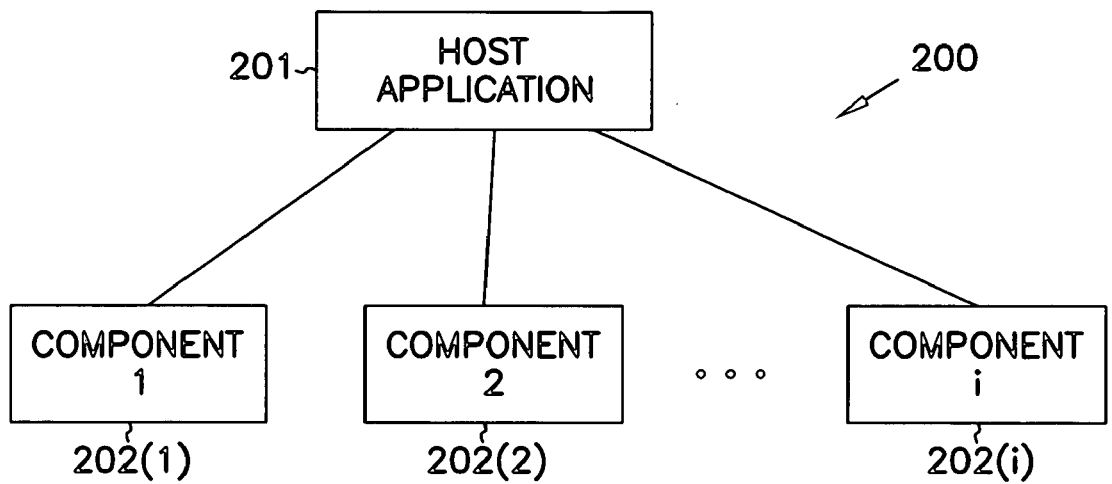
FIG. 2A is a suite application according to one embodiment of the invention.

FIG. 2A is a diagram of a typical suite application 200 according to one embodiment of the invention. The suite application 200 includes a host application 201 and at least one component 202. An example of a suite application is Visual Studio® which contains a number of components such as Visual J++®, Visual Basic®, Visual InterDev®, Visual Source Safe™, a database, text editor, form editor and hypertext markup language (HTML) editor. Components may interact with each other and are not limited to one particular "application". For example, the editor component of Visual Studio® can be utilized by the Visual J++® and Visual Basic® components.

The host application 201 may also be referred to as a shell application. The host application 201 provides a shell within which the at least one component 202 operates and can interact with one another and is not simply a program launcher. Additional components may be added to the at least one component 202 and components of the at least one component may be removed. The additional components can be developed or produced at later times or additional components may be purchased by a user as needed. The suite application is not the same as a program launcher that simply launches a number of grouped executable files. The suite application is a common environment in which the at least one components contribute and interact with each other.

Figure 2B:
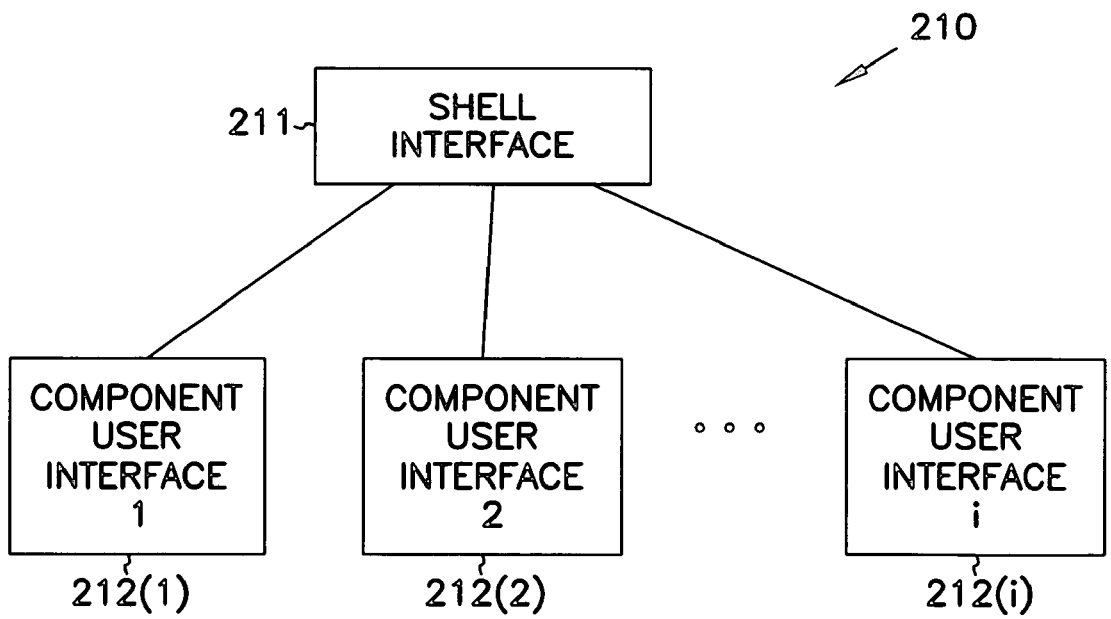
FIG. 2B is a user interface for according to one embodiment of the invention.

FIG. 2B is a diagram of a user interface 210 for a suite application according to one embodiment of the invention. The user interface 210 includes a shell interface 211 and at least one component user interface 212.

The shell user interface is the default user interface or skeleton user interface that contains only the most basic features or resources of the host application or shell application. The shell user interface permits a user to access the component user interfaces 212 and utilize the various components. The shell user interface includes a top level menu and a top level toolbar. These top level items may contain global commands that access the at least one components or global commands that are used by all components.

The component user interfaces 212 are user interfaces for the components. They allow a user to access the commands associated with that particular component. The component user interfaces 212 are built off of the shell user interface. The component user interfaces can, for example, add items, menus and toolbars to the top level menus and toolbars.

Figure 3A:
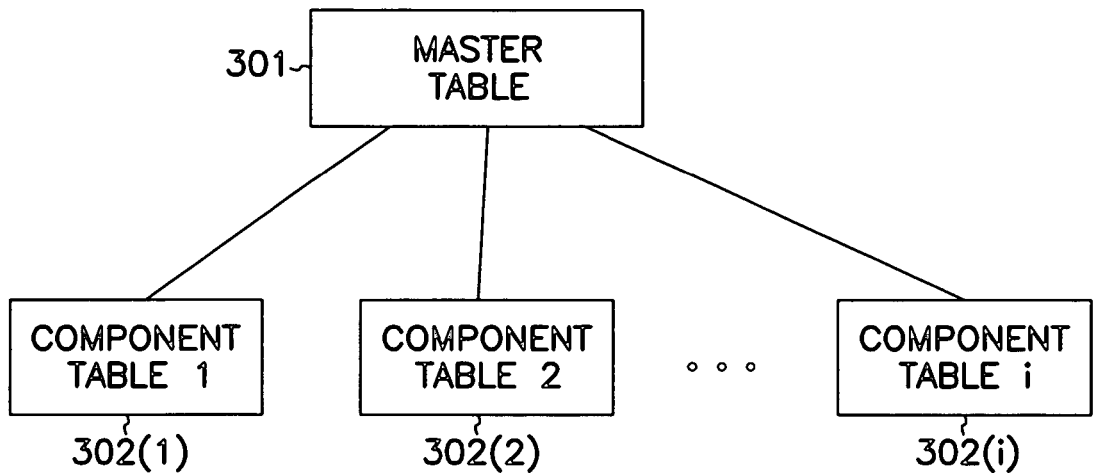
FIG. 3A is a system for generating a user interface according to one embodiment of the invention.

FIG. 3A is a system for generating a unified user interface for an application according to one embodiment of the invention. The system includes a master table 301 and at least one component data table 302.

The master table 301 is generated from the at least one component table 302. The master table 301 contains a complete collection of all the commands for the components. The master table 301 permits the user interface to be created for the host or shell application. The master table includes information regarding available commands, available command vectors, commands that are on menus, commands that are on toolbars and commands that map to keystrokes for the entire application. Generally, a command is invoked by a user to cause software to perform a task. Some examples of typical commands in an application are "file open", "cut", "copy" and "file save". The types of commands that may be used in a host application are virtually unlimited. A command vector is a place a user can go to get a set of commands. Some examples of typical command vectors are menus, toolbars and keyboard emulations. The master table includes object identifiers for commands and command vectors. The object identifier provides a unique identification for each command and command vector. This allows for situations in which there are multiple commands or command vectors with the same name. For example, a word processor component and a graphic program may both have components named "copy" that operate differently. By utilizing object identifiers, the correct "copy" command is used when the user requests it.

Commands include a flag indicating their status as to whether they are enabled or disabled. Commands are set to a default status by their corresponding component table 302. Commands can also have a number of other flags such as allowing keyboard bindings to the command. Thus, commands may exist but may not be visible. Context identifiers are used to allow a command to be enabled or disabled without requiring a component to be loaded into memory.

Each of the at least one component tables 302 is a data table for a particular component. Each table contains the various commands available for the corresponding component and the desired location for the commands in the user interface.

The content of each component table comprises available commands, available command vectors, commands that are on menus, commands that are on toolbars and commands that map to keystrokes for that particular component. Each command is assigned a default status as to whether it is enabled or disabled. A command that was introduced by another component table may have its status modified by a component table. Additionally, components can share commands.

The user interface is generated by utilizing a command data model. A command data model is a way of modeling a user interface or a syntax for modeling a user interface. Items on menus can be grouped. A separator line separates different groups. Items on toolbars are grouped and also use a separator line to separate different groups. A group, whether it is on a toolbar or menu, contains items. Items can be commands, submenus or other user interface controls. The other user interface controls can be, for example, edit boxes, drop down boxes and combination boxes.

Each command or command vector has a master group and each group has a master menu or master toolbar. Master groups, master toolbars and master menus allow the user interface for a suite application to be displayed appropriately. The master groups, master toolbars and master menus are collectively referred to as master objects. The master objects allow commands to be displayed hierarchically.

Each component table includes information for each command or command vector specifying where the command or command vector is located within the user interface according to the command data model. As stated earlier, the component tables 302 are merged to create or generate the master table 301. More than one component table may contribute to the contents of a group, menu or toolbar. One component can create a command vector as a menu called "File" and another component can add commands to that menu. Additionally, groups can be moved from one command vector to another command vector by a component installed at a later time.

The component table includes a description for adding commands to the user interface. The command table defines a group or finds an existing group and then, defines commands to be created in this group or existing commands to be added to this group. Additionally, the command table places the commands in the group and places the group on an existing menu or toolbar or creates a new menu or toolbar to add the group to. FIG. 3B shows an example of one such description in a command table and is further described below. Other ways of adding commands and specifying command tables may be used with this system.

Figure 3C:
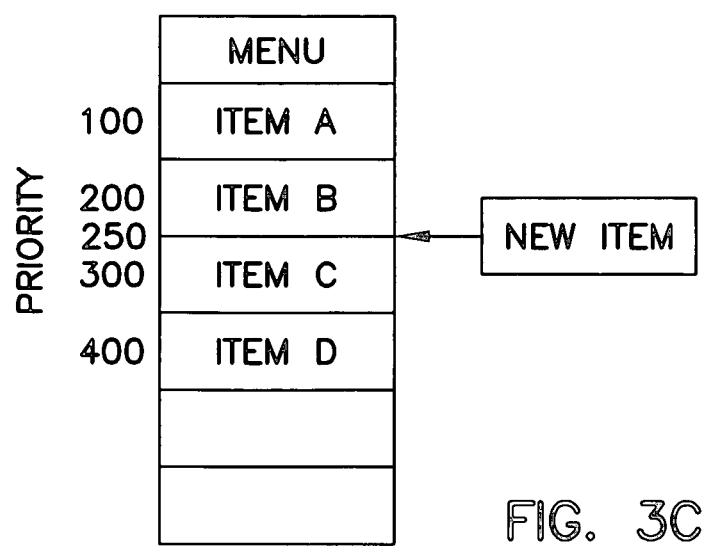
FIG. 3C is an example of utilizing priorities in a menu.

To appropriately create the user interface for the application, priorities are assigned to each menu, toolbar, group and command. FIG. 3C shows one example of utilizing priorities of items in a menu. Each group has a numeric priority within a menu or toolbar. Each command has a numeric priority within a group. For one embodiment, the space of numeric priorities is large (32 bits). Having priorities permits components to insert their commands at precise positions within the menu or toolbars. Priorities are evaluated in the merged table which allows components to insert a command between two commands from another component.

Another part of the user interface to create is the keyboard bindings. Keyboard bindings are a sequence of keystrokes that correspond to a command. Commands can be located on menus, toolbars and can have keyboard bindings simultaneously. An example of a keyboard binding is "ctrl+c" for a "copy" command. For one embodiment, keyboard bindings can be an unlimited length of character sequences such as "ctrl+c+d". Keyboard bindings are also assigned priorities because clashes may occur. A clash occurs when more than one component has assigned the same keyboard binding to different commands. This problem may be resolved by only enabling the keyboard binding with the highest priority and disabling the other keyboard bindings with lower priorities.

Additionally, third party software or users may assign additional keyboard bindings to commands. Clashes from additional keyboard bindings can be resolved at run time by assigning the additional bindings priorities using the lower 16 bits of 32 bits, while components assign priorities to keyboard bindings using the upper 16 bits of the 32 bits. Thus, a clash between a normal or component keyboard binding and an additional keyboard binding will resolve in favor of the normal keyboard binding. Clashes between two or more additional keyboard bindings will be resolved by the lower 16 bits of priority.

When an application is running, components are loaded when a command that utilizes a component is executed or accessed by a user. Components receive commands through a software interface known as the IoleCommandTarget interface. The interface permits the component to perform the actions required by the command. The interface can provide other information to components regarding commands such as the commands status.

Figure 3D:
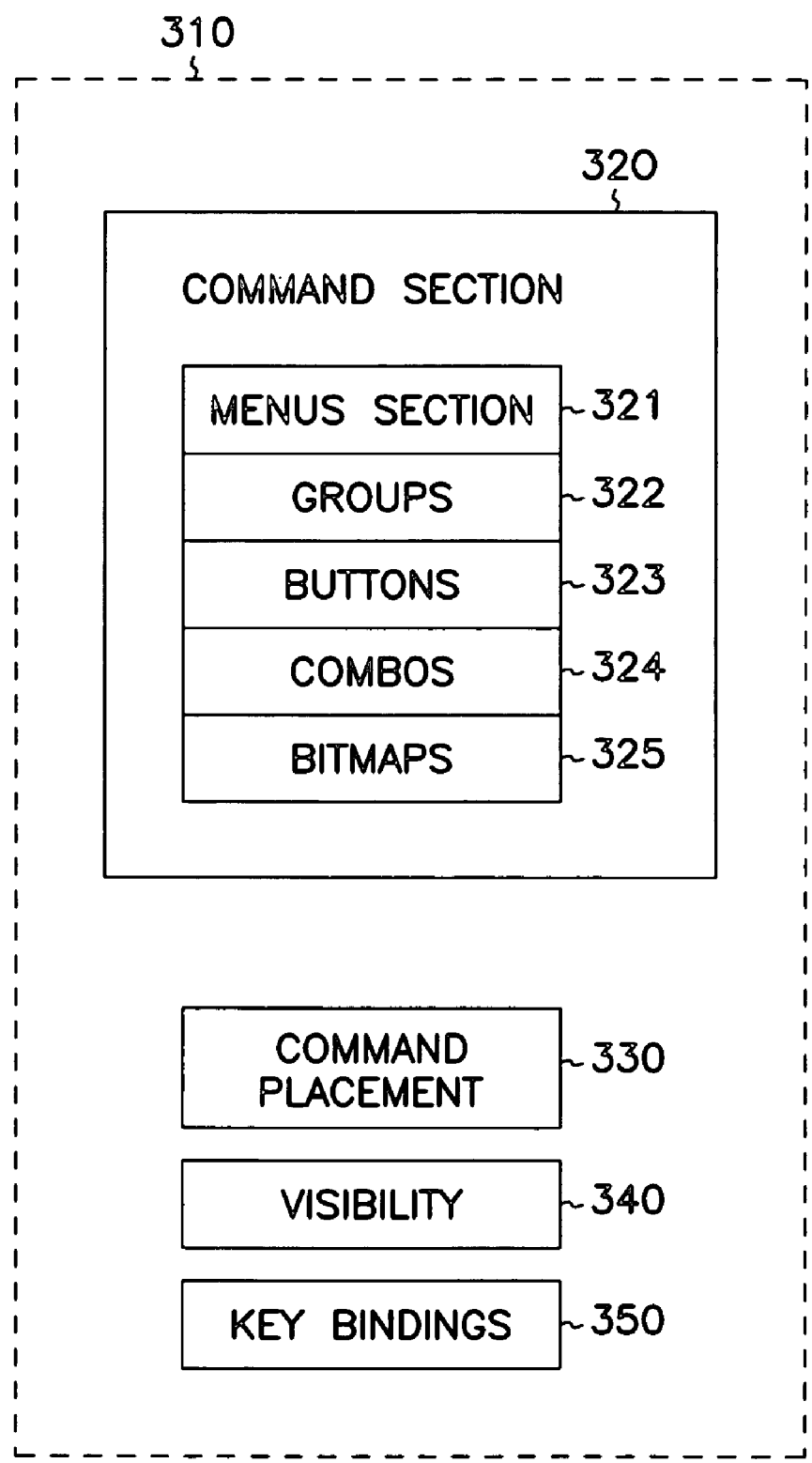
FIG. 3D is an exemplary command table according to one embodiment of the invention.

FIG. 3D shows one embodiment of a command table 310 according to the present invention. Other variations of a command table may be utilized to generate a user interface. The command table 310 is a text file that contains sections that can be understood by a special parser or compiler. The command table text file is also known as a resource text file. A command compiler generates a command table binary file from the text file. Generally, the command table or command table text file contains a number of sections within it. A command table provides user interface information with respect to one component.

One section or type of section is a command section 320. The command section 320 includes 5 subsections: menus 321, groups 322, buttons 323, combos 324 and bitmaps 325. The command section 320 takes a globally unique identifier (GUID) on its identifying line. Generally, the GUID should be the unique identification used for a particular component. This permits the host application to know which commands were contributed by which components. This assists operation of the application when it is running because the host application will know to load a component if a command has been selected from a component that is not currently loaded. Again, refer to FIG. 3B for an example of a command section in a resource text file. The FIG. 3B shows one command section with a menu, group and button subsection. A more detailed description of FIG. 3B is discussed below.

The menus section 321 is a subsection of a command section 320. For one embodiment, eight parameters: menu identification, group identification, priority, type, button text, menu text, tooltip text and command text are associated with the menu section 321. Other embodiments may vary. Each menu section 321 has a menu identification (MENUID) defined. The MENUID is a unique identifier for the menu. The group identification parameter is the unique identifier of the parent group of this menu. The parent group of this menu is the group where this menu will primarily be placed. Context menus do not have parents and use a 0 as the group identification. The type parameter determines the type of menu being created. The default type, if left blank, is a normal menu. Other options for the type parameter are "context" or "toolbar". Another parameter is button text. This parameter is the textual name of the menu if it were to appear as an item somewhere in a dialog or menu. The menu text parameter is the textual name that would show up when the item is a menu on the main menu bar. The tooltip text parameter is the tooltip that would show up, if the item can display tooltips. The command text parameter determines the text that is used by the command bar object model and extensibility to be able to get to this particular menu. The priority parameter assigns the menu a priority. The priority parameter is useful in the event of a conflict between a number of menus. Generally, the higher priority menu is enabled while the lower priority menu(s) are disabled.

Another subsection of the command section 320 is the group or new group section 322. For this embodiment, the group section includes 4 parameters. The first parameter is the group identification. The group identification is a unique identification for the group. The menu identification parameter defines the primary parent menu the group will be placed on. The priority parameter defines the priority of the group on the specified menu. A flag parameter is also used. The available flag determines whether the group is dynamic or not. A flag is set to dynamic if it should be filled in by multiple components or if the number of items in it is unknown until run time. Most groups should not have this flag set.

Another subsection of the command section 320 is the buttons section 323 in which a component defines its commands. The command, whether it is a button, a menu item or other type is recognized as a button type. For illustrative purposes only, some other types of commands are dropdown-combo such as a search combo box, splitdropdown such as an undo/redo button, memory combo which is a box that remembers what was previously typed in and a dynamic combo which is a combo box that requires data to be loaded from a component. Other types of commands may exist. The button type is the most commonly used command since it applies to toolbars, menus and context menus. The button section is comprised of 10 parameters. The command identification parameter defines a unique identification for the command. The group identification parameter defines the primary group that this command belongs to. Every command belongs to a primary group. The priority parameter defines the priority of the command within its specified group. The icon identification parameter defines the icon associated with a command. This permits the shell to display the icon corresponding to the icon identification parameter for the command. Any number of icons may be placed in a library file with each icon having a unique identification number. The button type parameter determines the type of button. The button type may be either a button, which is most common, or a splitdropdown. The flags parameter permits specifying a number of flags and their status. For example, flags may be used to show text changes and dynamic visibility. The text changes flag refers to the text being able to change during run mode as opposed to remaining static. The dynamic visibility refers to the command being able to be hidden or shown. The flags may be combined with boolean operators to allow more than one to apply. The button text parameter defines the text that shows up on buttons that are not in a menu off of the main menu bar. Some examples of button text are "cut", "copy", "paste" and "override method". The menu text parameter defines the text that shows up on the item if it is in a menu off of the main menu bar. This permits having a command with different text depending on where it is located in the menu structure such as on a context menu versus a main menu. A tooltip text parameter defines the text for the tooltip. The last parameter is the command name. This is the command name of the item that will show up in the customize and keyboard customization dialogs. These are dialogs which a user can use to modify and customize the operation of the user interface for an application. If text is not presented in this parameter, the button text parameter is used. The combo section 324 is the section in which a component defines its combo boxes.

The combo section 324 is also a subsection of the command section 320. There are three types of combo boxes that a package can add to the user interface: the MRU combo, dynamic combo and drop down combo. The MRU combo is a type of combo created and filled by the host application on behalf of the component. A user is able to type in the combo and the host application remembers up to 16 entries per combo. When the user selects something in the combo or types in something new, the host application notifies the appropriate component. The dynamic combo is created by the host application on behalf of the component. The component is responsible for filling in the contents of this combo. A user may type into this combo and may select items within it. The drop down combo is also created by the host application on behalf of the component. The component is also responsible for filling in the contents of this type as well. However, a user may not type or edit anything in the drop down type of combo box. The combo section generally includes 11 parameters: command identification, group identification, priority, secondary command identification, width, combo type, flags, button text, menu text, tooltip text and command name. The command identification parameter provides the command's unique identification. The group identification defines the primary group the combo resides in. The priority provides the priority of the command within the primary group. The secondary identification is a second unique identification that the host application will use to get items that should appear in the combo. The width parameter is the width of the combo box in pixels. The combo type parameter provides whether the combo is a MRU combo, dynamic combo, drop down combo or other combo types. However, the invention is not limited to any particular type or number of combos. Other combo types may also exist and can be used with the present invention. The flags parameter provides the flags for the combo. The flags parameter used here is similar to the flags parameter for the buttons section. The button text parameter specifies the text the combo box should take and is only necessary to add text to the tooltip, but it may be required to have text in all locations. The menu text parameter defines the text that shows up on the item if it is in a menu off of the main menu bar. This permits having a command with different text depending on where it is located in the menu structure such as on a context menu versus a main menu. A tooltip text parameter defines the text for the tooltip. The tooltip text may be presented differently to the user. The last parameter is the command name. This is the command name of the item that will show up in the customize and keyboard customization dialogs. If text is not presented in this parameter, the button text parameter is used.

The bitmaps section 325 is for defining bitmap resources for a component. The bitmaps section 325 is also a subsection of the commands section 320. This section includes two or more parameters with no upper limit. The first parameter is a resource identification. For each set of bitmaps, a new resource identification is set. An index parameter is used to associate or store the index number of all icons to be used from this resource. For example, a bitmap resource number 400 in a library file could include icons at indices 1, 10, 17 and 20.

The command placement section 330 is used for placing commands, groups or menus that are already defined in a different location. The command placement section 330 is not a subsection of the command section. This is useful so as not to duplicate all of the required information that was added in the commands section. This section does not need to be used if all commands are already placed into their primary groups. Additionally, this section allows reusing commands that have been added by other commands and placing them in other locations. This section only includes 3 parameters for each entry in the section. The first parameter is the identification of either the command, group or menu that is desired to be placed somewhere else. In one embodiment, commands are placed into groups. Groups are placed onto menus. Menus are placed into groups. The second parameter is the menu or group identification of the group or menu in which you want to place the item in the first parameter. The third parameter is a priority parameter. This defines the priority of the item from parameter 1 with respect to items in parameter 2.

A visibility section 340 determines the static visibility of commands. Commands may exist in an application but not be visible to a user. Such commands are set to non-visible. Commands can be put in this section that do not appear or become visible unless a specific component is active or installed. Typically, commands may be inserted into this section. Groups or menu identifiers may not be placed here. Commands not in this section are defined as visible by default. For one embodiment, a command is added to this section multiple times to permit the command to be visible for multiple components only. When the command tables are merged together, the multiple group identifications will be OR'd to determine the final static visibility. The visibility section includes 2 parameters. The first parameter is the command identification. This is the unique identification of the command for which static visibility is controlled. The second parameter is the identification of the component that the command is visible for. When the corresponding component is active, the command will be visible.

The last section described for the command table is the keybindings section 350. This section determines the keyboard mapping of the commands. For this embodiment, commands can have up to a 2 key binding associated with them (ie. "ctrl+x+ctrl+n"), as well as any number of key bindings that will execute the command. This is useful for having multiple key bindings for one command, say "cut", which could have both the "shift-delete" and "ctrl-x" key bindings. The keyboard bindings section includes 4 parameters, the command identification, the group identification of the editor, the group identification of the emulation and the keystate. The command identification parameter defines the identification of the command to assign a key binding to. The group identification of the editor defines the editor in which the key binding should be available. The group identification of the emulation parameter defines the identification of the emulation in which the key binding is available. The keystate parameter defines the actual key bindings. The two group identification parameters are used with separate key binding emulation software.

FIG. 3B is an example of a portion of a command table in text format. This example provides one command section. In the command section, is a menu section, a groups section and a buttons section. The menu section defines one menu and assigns the various parameters associated with it. The groups section defines three groups and each group is assigned the menu as its parent. The buttons section defines five buttons. The parameters for each button are defined including the group each button is assigned to.

Figure 4A:
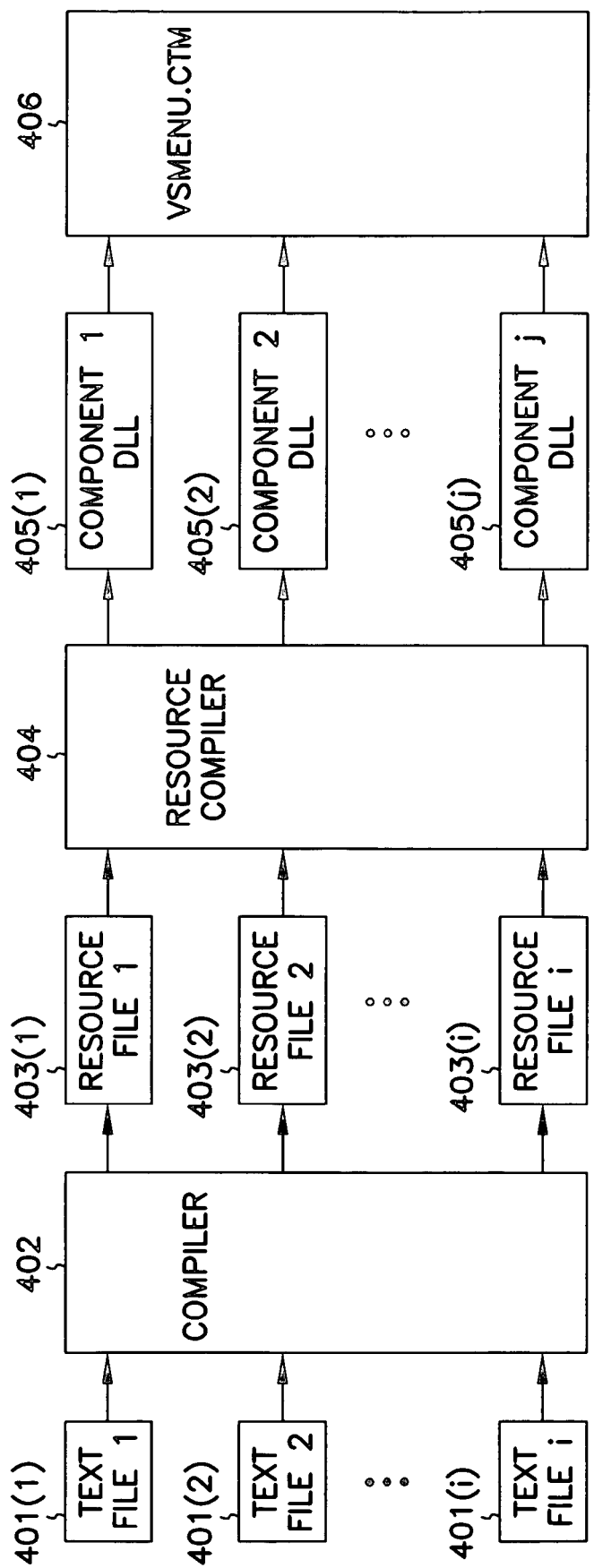
FIG. 4A is a system for modifying a user interface according to one embodiment of the invention.

FIG. 4A is a system for creating or modifying a user interface for an application according to one embodiment of the invention. The system includes at least one resource text file 401, a text compiler 402, at least one resource binary file 403, a resource compiler 404, at least one component library 405 and a master table file 406. This system is used with a shell or host application user interface to provide a complete user interface for an application.

Each of the at least one resource text file(s) 401 can be created by a programmer or developer. The at least one resource text file is/are in human readable predefined format similar to programming languages. The human readable predefined format can be in a format as is described with respect to FIG. 3D. However, the invention is not limited to the format described in FIG. 3D. Each contains information on laying out the user interface with respect to one component. However, any number of the at least one resource text file(s) 401 may provide user interface information with respect to a single component. Generally, the resource text files contain information regarding commands and/or command vectors and how they are presented in the user interface of the application, such as according to the format in FIG. 3D.

Additionally, the at least one resource text file(s) 401 are able to incorporate or include other text files. Thus, a number of the at least one resource text file(s) 401 can include another text file which can save time writing and developing the resource text files.

The text compiler 402 compiles the at least one resource text files 401 into at least one resource binary file 403. The text compiler 402 compiles each resource text file into a corresponding resource binary file. It is not required that all resource text files be compiled at the same time. Resource text files may be created and compiled at any time.

The at least one resource binary files 403 are in a binary format. A number of resource binary files may correspond to a particular component. In one embodiment, a resource binary file corresponds to one component. Other embodiments may have resource binary files that correspond to multiple components.

The resource compiler 404 compiles or links the resource binary files 403 into at least one component library file 405. There is not necessarily a one to one correspondence between resource binary files 403 and component library files 405. One or more of the at least one resource binary file(s) 403 are compiled or linked together to create each component library file for each corresponding component. It is not required that all component library files are generated at the same time. Component library files may be updated or added as new development of components dictates. In one embodiment, when components are added or installed, an entry is made in a system registry. The entry specifies the path name to the file the component library that contains the user interface resources for that component, the resource number of the menus in that file and a version number.

The component library files 405 are merged into the master table 406. In one embodiment, the merging is performed by a host application. However, the merging can be performed by other components and is not limited to being performed by the host application. The master table contains the user interface information for all the components in the application. The merging of the component library files is typically performed on an end user's computer when the application is initially installed or when components are added to or removed from the application. If components are added, the shell application will notice the new registry entries upon startup and will cause the reemerging of the component library files.

Figure 4B:
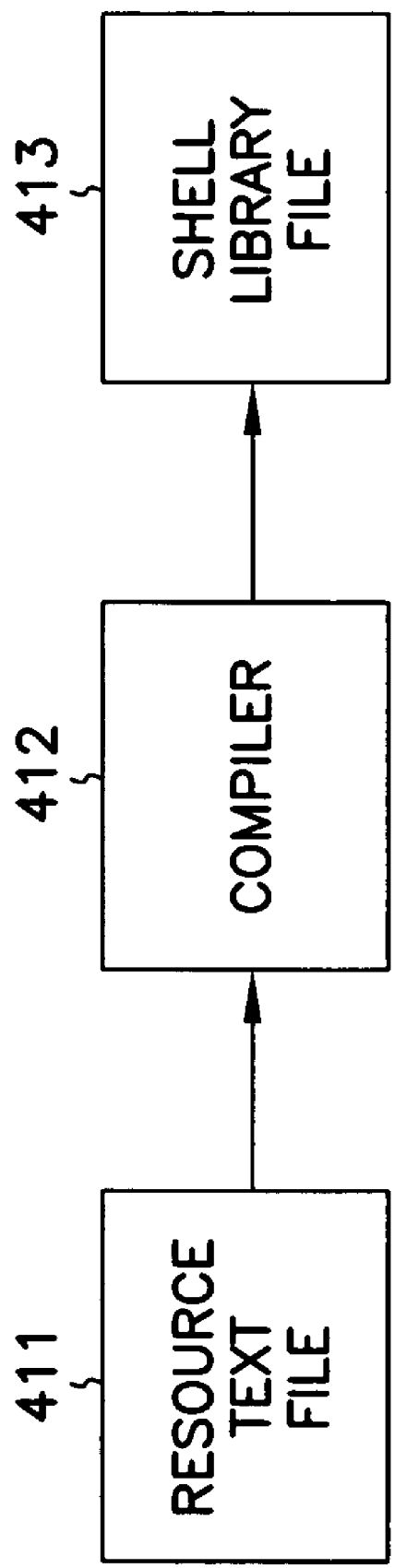
FIG. 4B is a system for generating a shell interface according to one embodiment of the invention.

FIG. 4B is a system for generating a shell interface for a host application or shell application. The host application or shell application, as described earlier, is the application within which components of the application suite are run. The host application can simply provide a minimal set of commands to allow a user to access other components. The system includes a shell resource text file 411, a shell resource compiler 412 and a shell library file 413. The shell resource text file 411 contains information to create the shell interface of the application and is specified in a textual format. The information contained in the shell resource text file provides the menus and toolbars that are to be shown to the user initially. The shell resource text file 411 is compiled by the shell resource compiler 412 and a shell library file is output. The shell library file 413 is a binary form of the shell resource text file 411. The shell library file 413 may be used on starting up an application to build the user interface. Alternately, the shell library file 413 may be merged with other component library files such as the library files of FIG. 4A.

Figure 5:
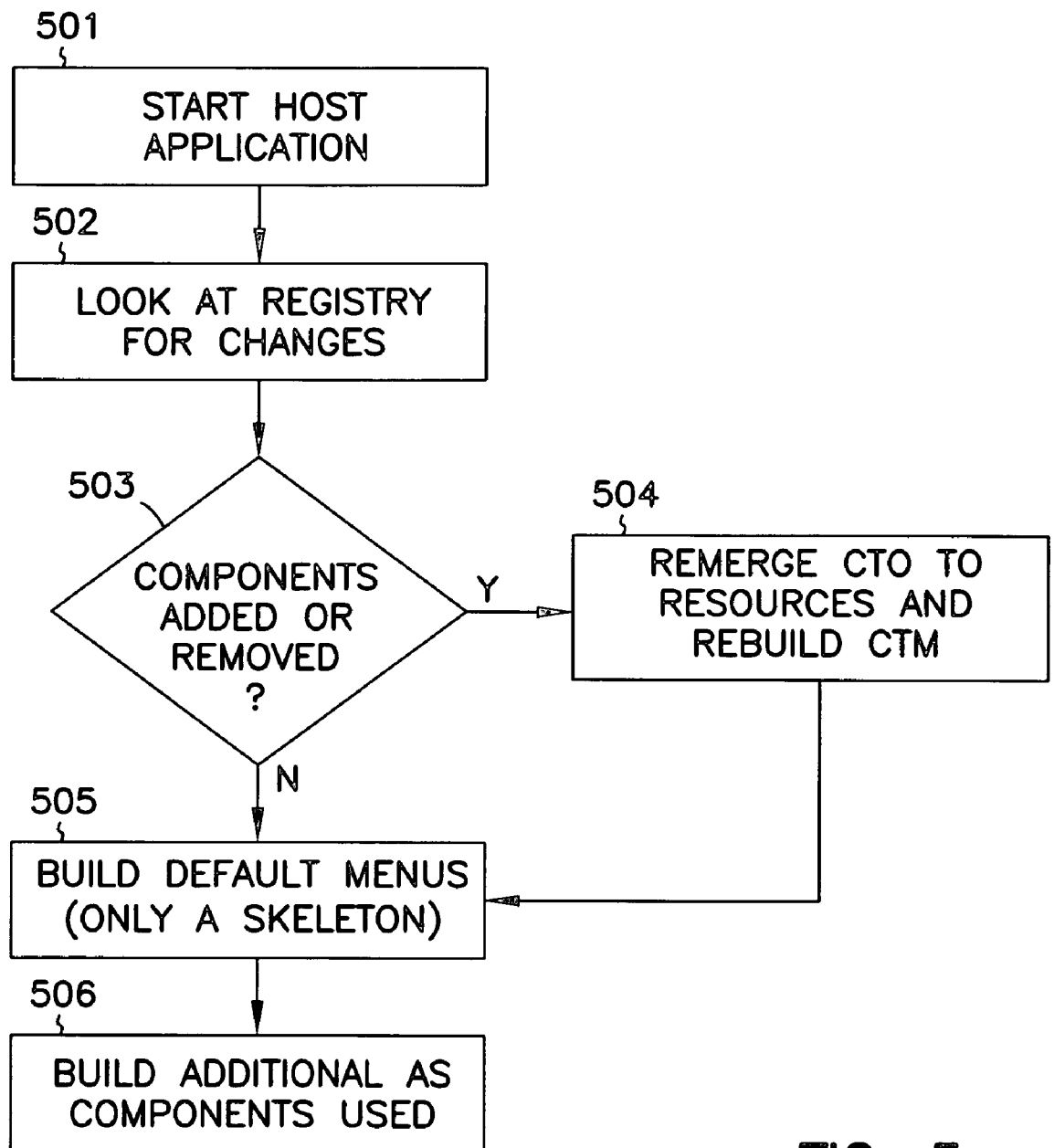
FIG. 5 is a method for building a user interface for an application according to one embodiment of the invention.

FIG. 5 is a method for building a user interface for an application. The application includes a host or shell application and one or more components.

The host application is started or initiated at block 501. A registry is examined for any changes in entries for the application at block 502. The registry is a file used by an operating system to store program related information. An example of such a registry is the registry file used in Microsoft Windows® brand operating system. The changes may relate to entries for the host application or the one or more components.

A determination is made as to whether components have been added to or removed from the application at decision block 503. This determination is made by investigating changes in registry entries for the application. The changes may signify that one or more components have been added or that one or more components have been removed.

If components have been added or removed at 503, the shell resources and component resources are merged or reemerged into a master table at block 504. After the resources are reemerged, the shell menu is built and displayed at 505. The shell resources and component resources are pre-existing and may have been designed and created by a developer. The resources specify the characteristics of the user interface of the application. The shell resources specify the characteristics of the user interface for the host or shell application and the component resources specify the characteristics of the user interface for the components. The first time that the application is run or executed after it has been installed, the registry entries will show component changes and the shell and component resources are merged into the master table.

If components have not been added or removed at 503, the method proceeds directly to block 505. At block 505, the shell menu is built and displayed. The shell menu is a default menu or skeleton menu that contains only the most basic component of the host application or shell application. The shell menu is created from the master table. The design of the shell menu is specified in a shell resources file that is merged with other resource files at block 504.

As additional components of the application are used, the menus for the components are built at block 506.

CONCLUSION

The invention permits the modularized approach to designing and developing software to be used in designing and developing a product's user interface. This approach can allow applications and interfaces to be modified at any time without forcing a re-release of the product. Additionally, user interfaces can be designed and updated to match user's needs as they changed. From the detailed description and the various embodiments described, many other variations could be developed within the scope of the invention. It is intended that only the claims and equivalents thereof limit this invention.

What is claimed is:

1. A computing environment comprising a processor providing a unified user interface for a modular software component-based shell application having a plurality of software components that execute within the shell application comprising:

a plurality of component tables, each component table corresponding to and providing resource information about a particular software component of the application, each component table including at least one command for the corresponding component, and each component table including a description for adding each command to the user interface, each command having an associated priority;

a master table merged from the plurality of component tables, said master table including available commands and available command vectors for the application, each command and command vector having a unique object identifier and a visibility flag specifying whether the command or command vector is to be displayed within the interface to a user of the interface, and said master table comprising at least one information element from among the following information elements: available commands including commands that are not menu commands; available command vectors including command vectors that do not correspond to menus commands; commands that are on toolbars; and commands that map to keystrokes; and a unified user interface automatically generated from the master table;

wherein the master table is reemerged from the component tables and the user interface is automatically regenerated from the reemerged master table in response to modification of a software component of the application.

2. The computing environment of claim 1, wherein the shell application is part of a suite application providing a common environment for the plurality of components.

3. The computing environment of claim 2, wherein the suite application has a shell user interface and each of the plurality of components has a component user interface different from the shell user interface.

4. The computing environment of claim 1, wherein the master table includes available commands, menus and toolbars and the location of each available command.

5. The computing environment of claim 1 wherein components can be subsequently added by a user of the application.

6. The computing environment of claim 1 wherein additional components are can be subsequently added after development of the application.

7. A computer-readable medium comprising computer-readable instructions for a unified user interface for a modular software component-based shell application having a plurality of software components that execute within the shell application, said computer-readable instructions comprising instructions for:

a plurality of component tables, each component table corresponding to and providing resource information about a particular software component of the application, each component table including at least one command for the corresponding component, and each component table including a description for adding each command to the user interface, each command having an associated priority;

a master table merged from the plurality of component tables, said master table including available commands and available command vectors for the application, each command and command vector having a unique object identifier and a visibility flag specifying whether the command or command vector is to be displayed within the interface to a user of the interface, and said master table comprising at least one information element from among the following information elements: available commands including commands that are not menu commands; available command vectors including command vectors that do not correspond to menus commands; commands that are on toolbars; and commands that map to keystrokes; and a unified user interface automatically generated from the master table;

wherein the master table is reemerged from the component tables and the user interface is automatically regenerated from the reemerged master table in response to modification of a software component of the application.

8. The computer-readable medium of claim 7 further comprising instructions whereby the shell application is part of a suite application providing a common environment for the plurality of components.

9. The computer-readable medium of claim 8 further comprising instructions whereby the suite application has a shell user interface and each of the plurality of components has a component user interface different from the shell user interface.

10. The computer-readable medium of claim 7 further comprising instructions whereby the master table includes available commands, menus and toolbars and the location of each available command.

11. The computer-readable medium of claim 7 wherein components can be subsequently added by a user of the application.

12. The computer-readable medium of claim 7 wherein components can be subsequently added after development of the application.

* * * * *

UNITED STATES PATENT AND TRADEMARK OFFICE
CERTIFICATE OF CORRECTION

Page 1 of 1

PATENT NO. : 7,512,899 B1
APPLICATION NO. : 09/519206
DATED : March 31, 2009
INVENTOR(S) : Derek Hoiem et al.

It is certified that error appears in the above-identified patent and that said Letters Patent is hereby corrected as shown below:

In column 13, line 52, in Claim 1, delete "reemerged" and insert -- remerged --, therefor.

In column 13, line 54, in Claim 1, delete "reemerged" and insert -- remerged --, therefor.

In column 14, lines 6-7, in Claim 6, after "wherein" delete "additional".

In column 14, line 7, in Claim 6, after "components" delete "are".

In column 14, line 39, in Claim 7, delete "reemerged" and insert -- remerged --, therefor.

In column 14, line 41, in Claim 7, delete "reemerged" and insert -- remerged --, therefor.

Signed and Sealed this
Nineteenth Day of July, 2011

David J. Kappos
*Director of the United States Patent and Trademark Office*